June 2, 1970   J. C. KING   3,515,841
APPARATUS FOR PRODUCING A WELDMENT OF THIN METAL
Filed Aug. 29, 1967
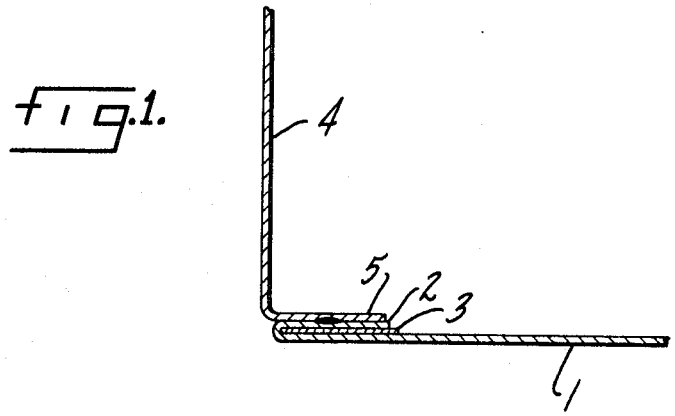
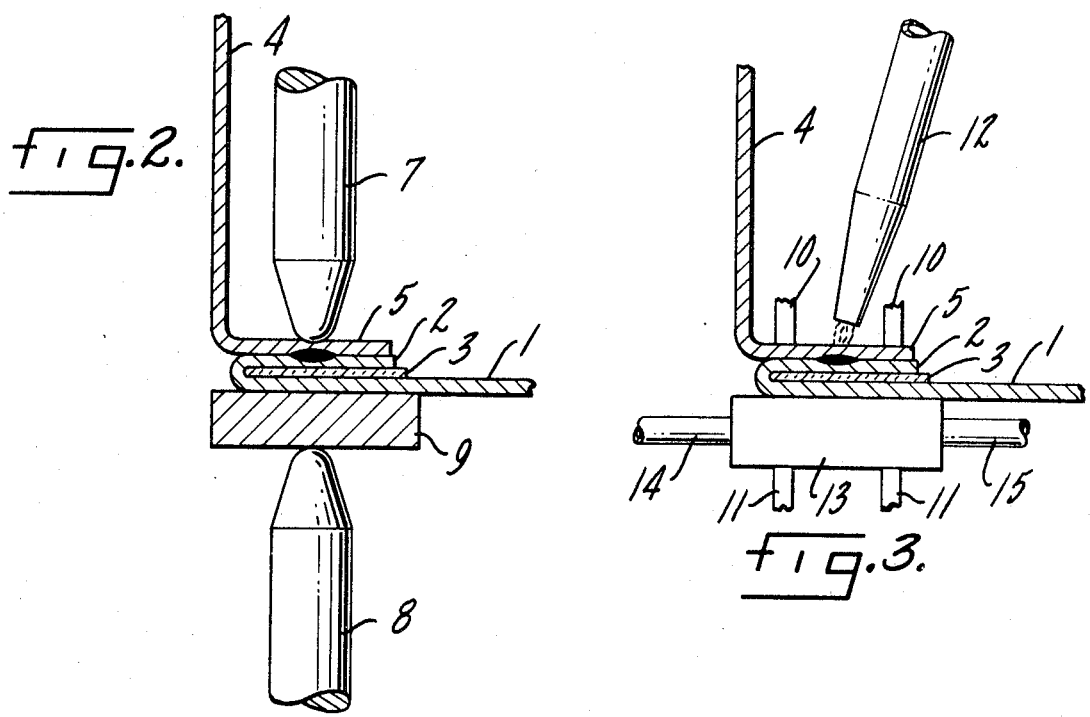
INVENTOR.
Jack C. King,
BY Parker & Carter
Attorneys.

United States Patent Office 3,515,841
Patented June 2, 1970

3,515,841
APPARATUS FOR PRODUCING A WELDMENT OF THIN METAL
Jack C. King, Muskegon, Mich., assignor to The Shaw-Walker Company, Muskegon, Mich., a corporation of Michigan
Filed Aug. 29, 1967, Ser. No. 663,999
Int. Cl. B23k *11/10*
U.S. Cl. 219—91     1 Claim

ABSTRACT OF THE DISCLOSURE

Apparatus and method for producing weldments of thin metal in such way as to avoid the usual shrinkage marks on the outer face of the thin panel of the material. This is accomplished by folding back into general parallelism with the panel an edge portion thereof with a sheet of insulating material between the panel and the edge portion holding the folded back portion into contact with the base to which it is to be welded and applying the welding heat through the base to the folded back portion only while maintaining the temperature of the panel in the area of the insulating sheet above the welding temperature.

SUMMARY OF THE INVENTION

This invention relates to the manufacture of boxes, shelves, metal furniture and the like wherein thin sheets of metal are welded together. The object of the invention is to produce the weldment without the exposed or front portion of the thin panel being marked by the conventional welding shrinkage marks, thus eliminating the expense of refacing a welded panel.

Other objects will appear from time to time throughout the specification and claims.

BRIEF DESCRIPTION OF THE DRAWINGS

Referring to the drawings:
FIG. 1 is a section through the corner of a file drawer illustrating the application of the invention;
FIG. 2 is a large scale section of the weld illustrating the method of formation thereof;
FIG. 3 is a section similar to FIG. 2 showing a modified form of welding apparatus.

Like parts are indicated by like numerals throughout the specification and drawings.

DESCRIPTION OF THE PREFERRED EMBODIMENTS

The welding apparatus is conventional and so the details thereof need no illustration. Suffice it to say that the welding apparatus includes the usual mechanism for removably holding the parts of the weldment together, together with the necessary electric circuits for electric welding or the necessary heat source for other heat welding.

The invention is illustrated as applied to a file drawer which includes an outer front panel 1, folded back about an edge as at 2 with a sheet of insulating material 3 between the back of the outer panel 1 and the folded back portion 2. The side of the file drawer 4 is flanged at the edge 5 to define the base to which the front panel is to be held by welding.

Referring to FIG. 2, the usual electrode 7 is held against the flange 5. The electrode 8 holds the abutment plate 9 against the outer face of the panel 1 to press the folded back portion 2 into close contact with the flange 5. The insulating sheet 3 between the panel 1 and the folded back portion 2 insures that when current is applied to the abutment plate 9, it will flow with minimum resistance through the panel 1 around the insulating sheet 3 into the folded back portion 2 and the flange 5 to the electrode 7 to form the weld in the usual manner between the flange 5 and the turned back portion 2. Because of the relatively large size of the abutment plate 9 and the interposition of the insulating sheet between the panel and the folded back portion, the temperature of the abutment plate and the panel will remain far below the welding temperature and the welding temperature applied to the base or flange 5 will not reach and will not affect the front surface of the panel 1.

In the modified form shown in FIG. 3, the panel 1, the folded back portion 2 are held against the base or flange 5 by pressure members 10, 11 forming the usual part of a welding apparatus. The torch 12 directs welding heat against the flange or base 5 to weld it to the folded back portion 2.

In this case also the insulating sheet 3 protects the panel 1 against the welding temperature applied to the folded back portion 2 and the flange 5. If desired, the cooling effect of the abutment plate—in this case 13—may be emphasized by the fact that the plate is hollow and a liquid coolant may be circulated therethrough through the ducts 14, 15 from any suitable source of cold, forming no part of the invention and therefore not specifically illustrated. Any suitable expander, evaporator, refrigeration cycle can be used for this purpose.

For convenience I have shown electrode 8 and abutment plate 9 as separate though of course the electrode might have an abutment plate integral therewith in any desired shape or size.

The shunting of the current around the clearance defined by the insulating panel or in the absence of the insulating panel, around the clearance formed when the folded back portion 2 is formed is of the utmost importance because it protects the face of the panel—which will be later visible to the eye—against any welding heat or distortion.

I claim:
1. A weldment assembly associated with two flanged perpendicular panels where a first panel is perpendicularly flanged and a second panel is folded back along one edge thereof to form a flange co-extensive with and in face to face contact with the flange on the first panel, an insulating sheet between the second panel and the flange thereon, the second panel and both flanges extending away from the first panel in the same direction, and a weld connecting said flanges together, said weldment assembly being formed by means of an abutment conducting plate in contact with the face of the second panel at the flanged edge thereof, electrodes in contact respectively with the abutment plate and with the flange on the first panel, adapted to conduct a welding current through the abutment plate, through the second panel, around the insulating sheet and through both flanges to weld them together.

References Cited

UNITED STATES PATENTS

| | | | |
|---|---|---|---|
| 1,568,080 | 1/1926 | Meadowcroft | 219—92 |
| 2,001,688 | 5/1935 | Paugh | 219—91 |
| 2,599,045 | 6/1952 | Brolaski | 219—91 |
| 2,782,495 | 2/1957 | Beck et al. | 219—91 |
| 3,132,236 | 5/1964 | Deininger | 219—92 |
| 3,407,280 | 10/1968 | Mitchell et al. | 219—91 |

JOSEPH V. TRUHE, Primary Examiner
W. D. BROOKS, Assistant Examiner